United States Patent [19]

Takagi

[11] Patent Number: 5,672,221
[45] Date of Patent: Sep. 30, 1997

[54] GAP-SETTING APPARATUS FOR A GLASS PANEL

[75] Inventor: Shigeyuki Takagi, Toyohashi, Japan

[73] Assignee: Sintokogio, Ltd., Japan

[21] Appl. No.: 499,018

[22] Filed: Jul. 6, 1995

[30] Foreign Application Priority Data

Jul. 8, 1994 [JP] Japan ................. 6-180620

[51] Int. Cl.⁶ ........................... G02F 1/1339
[52] U.S. Cl. ................. 156/109; 156/286; 359/80
[58] Field of Search ....................... 156/109, 104, 156/381, 382, 286, 292, 581, 583.1; 359/62, 80; 445/24, 44, 66, 70

[56] References Cited

U.S. PATENT DOCUMENTS 5,183,121  2/1993  Miyashita et al. ............. 156/286
5,508,833  4/1996  Saito et al. ..................... 359/80

FOREIGN PATENT DOCUMENTS 01257824  10/1989  Japan .

Primary Examiner—Michael W. Ball
Assistant Examiner—Michael A. Tolin
Attorney, Agent, or Firm—Limbach & Limbach L.L.P.

[57] ABSTRACT

An apparatus for setting a gap between glass substrates (13, 14) of a glass panel (P), wherein the glass panel is clamped by a constant force regardless of its thickness. The apparatus includes a flexible and annular movable plate (4) biased by coil springs (5, 5) toward an annular immovable plate (1) so as to clamp the glass panel (P). The immovable and movable plates (1, 4) have a first gasket (3) and a second gasket (6) respectively to clamp the glass panel (P). At an outward part of the first and second gasket a third gasket (8) is disposed between the immovable and movable plates at a level such that the distance between the bottom of the second gasket (6) and the top of the first gasket (3) before the glass panel is placed between the first and second gaskets (3, 6) is smaller than the thickness of the glass panel when the biased movable plate (4) presses the third gasket (8). To obtain a desired gap between the glass substrates (13, 14), the air between them is evacuated by a suction pipe (10) through a chamber (S) defined by the glass substrates, first, second, and third gaskets, and immovable and movable plates. The suction pipe (10), at one end, where the chamber is located, has a flow control valve (11) to obtain a desired rate of air flow by suction.

5 Claims, 1 Drawing Sheet

GAP-SETTING APPARATUS FOR A GLASS PANEL

BACKGROUND OF THE INVENTION

1. Field of the Invention

This invention relates to an apparatus for setting a gap between glass substrates of a glass panel by pressing opposing surfaces of the glass panel wherein the glass substrates have on their inner surfaces transparent electrodes and a thermoset resin.

2. Description of the Prior Art

Japanese Patent A, 1-257824 teaches a method of setting a gap of a glass panel wherein the glass panel is indirectly pressed by using a vacuum. However, in a device to carry out this method the force to clamp a glass panel varies depending on the thickness of the glass panel. This causes an inferior gap-setting The purpose of this invention is to provide a gap-setting apparatus for a glass panel that can clamp the panel with a constant clamping force that is independent of the thickness of the panel.

SUMMARY OF THE INVENTION

To this end, the device of the invention to set the gap for a glass panel includes an annular and immovable plate to support the glass panel. The glass panel has a pair of glass substrates, which have on their inner surfaces transparent electrodes and a thermoset resin; a first annular gasket disposed on the upper surface of the inner peripheral part of the immovable plate so as to sealingly support the glass panel at the bottom of its outer peripheral part; a plurality of studs to support the immovable plate at its outer circumferential part; a flexible and annular movable plate disposed above the immovable plate and slidably mounted on the studs, the movable plate being biased by springs engaging the upper surface thereof toward the immovable plate; a second annular gasket disposed on the bottom of the movable plate at its inner peripheral part so as to press the upper surface of the glass panel at its outer peripheral part; a third annular gasket disposed outward of the first gasket and between the movable and immovable plates so as to define a sealed chamber in association with the first and second gaskets, movable and immovable plates, and a glass panel to be placed between the first and second gaskets, the third gasket being positioned at a level such that the distance between the bottom of the second gasket and the upper surface of the first gasket before the glass panel is placed between the first and second gaskets is smaller than the thickness of the glass panel when the bottom of the biased movable plate is pressed against the third gasket; and a suction pipe to communicate with the chamber.

Accordingly, the force to clamp the glass panel between the immovable plate (the first gasket) and the movable plate (the second gasket) by means of the biasing force of the springs is substantially constant. Even if the thickness of the glass panel is changed, the change, i.e., an increase or decrease, is absorbed by the flexibility or deflection of the flexible movable plate, and the clamping force is kept substantially constant. Thus the clamping force does not cause an inferior gap-setting.

DESCRIPTION OF THE PREFERRED EMBODIMENT

Figure 1:
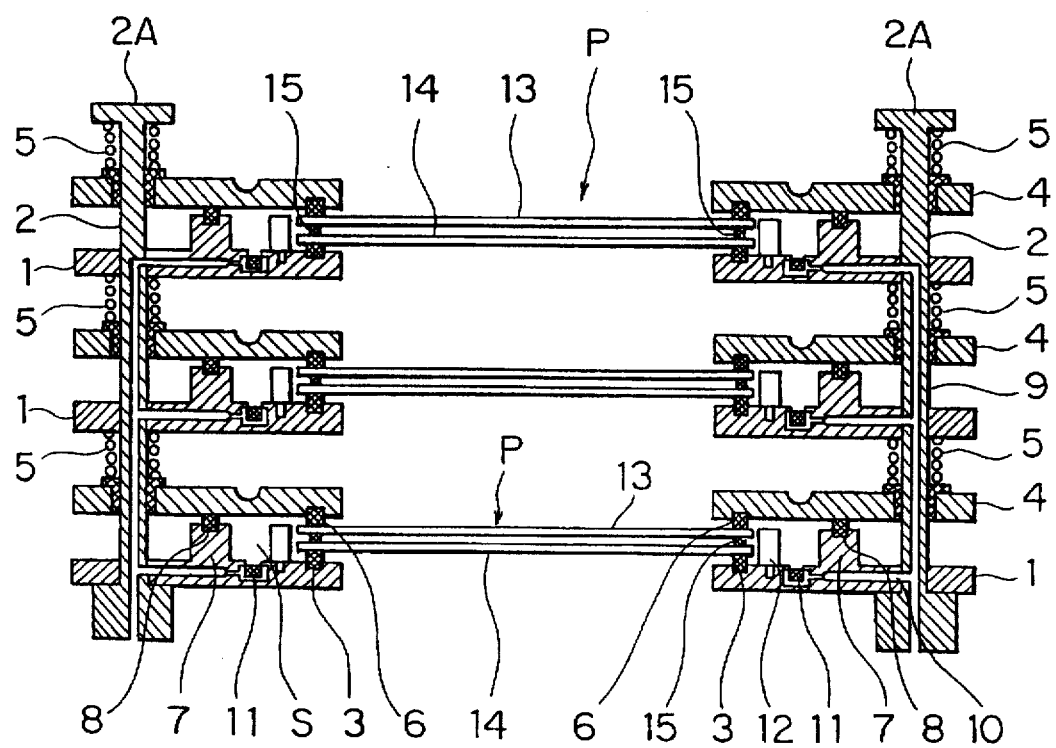
FIGURE 1 is a sectional and elevation view of an embodiment of the invention.

The embodiment of the invention will now be explained by reference to FIGURE 1. One or more annular immovable plates 1 (for example, in the drawing three are shown), each to support a glass panel P to be processed, are disposed vertically and spaced apart from each other. A plurality of studs 2, 2 penetrate the immovable plates 1, 1, 1 at their outer peripheral parts such that the plates are fixedly mounted on the studs. A first annular gasket 3, to sealingly support each glass panel P at the bottom of its outer peripheral part, is embedded in the upper surface of the inner peripheral part of each immovable plate 1 such that the upper surface of the first gasket 3 extrudes from the top of the immovable plate 1.

An annular movable plate 4, which is made of rubber, synthetic resin, or the like, is disposed above each movable plate 1. The movable plate 4 is slidably mounted on the studs 2. Retracted coil springs 5, 5 are disposed around the studs 2, 2 between each immovable plate 1 and each movable plate 4 (for the highest movable plate, coil springs 5, 5 are placed between it and engaging parts 2A, 2A, one formed on the top of each stud) such that the springs bias the movable plate 4 downward.

A second annular gasket 6, to sealingly press the top of the outer peripheral part of the glass panel P, is embedded in the bottom of the inner peripheral part of the movable plate 4 such that the second annular gasket 6 opposes the first gasket 3. Further, outwardly spaced apart from the first gasket 3, an annular projection 7 is formed on the top of the immovable plate 1. A third annular gasket 8, to contact the bottom of the movable plate 4, is embedded in the annular projection 7. The third gasket 8 is positioned at a level such that the distance between the bottom of the second gasket 6 and the upper surface of the first gasket 3 before the glass panel is placed between the first and second gaskets 3, 6 can be smaller than the thickness of the glass panel P when the bottom of the biased movable plate 4 is pressed against the third gasket 8.

A first suction pipe 9 is buried in each stud 2. At one end the first suction pipe 9 is connected to a vacuum pump via a heat-resistant hose (the pump and hose are not shown in the drawing). At the other end (or distal end) and at locations where the immovable plates are positioned the pipe 9 is connected to second suction pipes 10, each respective pipe 10 being buried in the immovable plate 1. The distal end of each second suction pipe 10 communicates with the space above the immovable plate 1 and between the first and third gasket 3, 8. A flow control valve 11 is attached to the distal end of the second suction pipe 10. Adjacent the first gasket 3 a plurality of guide pins 12, 12, to confine the glass panel P to be processed, are embedded in the immovable plate 1.

Below will be explained the setting of the gap between the two glass substrates 13, 14 of each glass panel P by using the apparatus in the drawing. Before placing the glass panels P in the apparatus, the glass substrates 13, 14, having transparent electrodes on their inner surfaces, are temporarily connected to each other by desirably coating them with a thermosetting resin 15. The temporarily connected substrates form a glass panel P. Thus the glass panels are prepared. Further, an oven (not shown) is used to accommodate the gap-setting apparatus, which clamps the panels P.

One movable plate 4 of the apparatus is moved up against the biasing force of the coil springs 5, 5. Then a prepared panel P is placed within guide pins 12, 12 on the immovable plate 1. After this, the movable plate 4 is slowly lowered. Thus the top and bottom of the outer peripheral part of the glass panel P are clamped by the first and second gaskets 3, 6 due to the biasing force of the retracted coil springs 5, 5.

At this time the third gasket 8 is pressed against the bottom of the movable plate 4 in an air-tight or sealed condition. Thus an air-tight space or chamber S is defined by the immovable and movable plates 1, 4, first, second, and third gaskets 3, 6, 8, and glass panel P. In the same way two other glass panels are set in the apparatus. The apparatus is then rotated through 90 degrees to set the panels P upright. This prevents the panels from being deflected.

Then, the air in each air-tight chamber S is evacuated by the vacuum pump (not shown) through the suction pipes 9, 10. Accordingly, the air between the glass substrates 13, 14 is evacuated, thereby applying an atmospheric pressure that is proportional to the degree of the vacuum generated, to the top and bottom of the glass panel. Thus a required gap between the glass substrates 13, 14 is obtained. The gap may be changed by controlling the degree of the vacuum and thereby controlling the force applied to the glass substrates due to the atmospheric pressure. Since the gap between the substrates 13, 14 is as narrow as generally about 7 μm, the resistance to the evacuation is strong, and much time is necessary to complete the evacuation. If the evacuation is carried out too rapidly, spherical spacers (not shown), which are disposed between the substrates, are also moved. This may cause a problem in setting the gap precisely. To control the rate of the air flow due to the evacuation to avoid this problem, a flow control valve 11 is used. When the evacuation was carried out at the rate of 0.1 kgf/cm$^2$/min, no movement of the spherical spacers was observed.

Since in the gap-setting method explained above a vacuum is used, the maximum pressure to be applied to the panel P is 1 kgf/cm$^2$. Therefore, spherical spacers and glass fiber spacers of adequate sizes must be selected so as to obtain a uniform and precise gap below a pressure of 1 kgf/cm$^2$. When a desired gap is 6.2 μm, and when glass fiber spacers of 7 mm diameter and spherical spacers of 6.5 μm are used, the best pressure to be applied to the glass panel is 0.2–0.8 kgf/cm$^2$. Thus the air in the glass panels is evacuated by vacuum suction so that the pressure in the glass panels reaches a desired value.

When the desired pressure is obtained, the glass panels and the apparatus, which still continues the vacuum suction, are put in the oven and heated at a temperature of 150° C. for two hours. Accordingly, the thermosetting resin 15 reacts and hardens. The apparatus is then taken out of the oven. After the temperature of the apparatus and the glass panels naturally lowers to the ambient temperature by the radiation of the heat, the communication of the first suction pipe 9 with the vacuum pump is stopped, and the panels are successively removed from the apparatus by forcing the movable plates 4 up, thereby obtaining completed glass panels.

As is clear from the above explanation, since the temporarily clamped glass panels are clamped by using the biasing force of the coil springs, and since the difference in the thickness of the glass panels is absorbed or canceled by using a flexible movable plate, the glass panels can always be clamped by a constant force. This avoids the clamping force from causing an inferior gap-setting for the glass panels.

Further, when a flow control valve is attached to a vacuum suction pipe, any undesirable movements of the spherical spacers can be prevented. Even if a glass panel breaks, the rapid drop of the degree of the vacuum can be prevented when a flow control valve is used. This enhances the reliability of the process.

What I claim is:

1. An apparatus for setting a gap of a glass panel having a pair of glass substrates having on inner surfaces thereof transparent electrodes and a thermoset resin, comprising:

an annular immovable plate to support the glass panel;

a first annular gasket disposed on an upper surface of an inner peripheral part of the immovable plate so as to sealingly support the glass panel at the bottom of an outer peripheral part thereof, a plurality of studs to support the immovable plate at an outer circumferential part thereof;

a flexible and annular movable plate disposed above the immovable plate and slidably mounted on the studs; the movable plate being biased by springs engaging the top of the movable plate toward the immovable plate;

a second annular gasket disposed on the bottom of the movable plate at an inner peripheral part thereof so as to press the upper surface of the glass panel at an outer peripheral part thereof, a third annular gasket disposed outward of the first gasket and between the movable and immovable plates so as to define a sealed chamber in association with the first and second gaskets, the movable and immovable plates, and the glass panel to be placed between the first and second gaskets, the third gasket being positioned at a level such that a distance between the bottom of the second gasket and the upper surface of the first gasket before the glass panel is placed between the first and second gaskets is smaller than the thickness of the glass panel when the bottom of the biased movable plate is pressed against the third gasket; and a suction pipe to communicate with the chamber.

2. The apparatus of claim 1, wherein the apparatus includes pairs of the immovable and movable plates, said pairs being vertically arranged on the studs and spaced apart, and said springs being disposed between the movable plate of a lower pair and the immovable plate of another pair that is positioned above the lower pair.

3. The apparatus of claim 2, wherein a flow control valve is attached to the suction pipe at one end thereof where the chamber exists.

4. The apparatus of claim 1, wherein a flow control valve is attached to the suction pipe at one end thereof where the chamber exists.

5. The apparatus of claim 1, wherein each flexible and annular movable plate has an annular notch in an upper surface thereof.

* * * * *